United States Patent Office 3,106,468
Patented Oct. 8, 1963

3,106,468
HARDENERS FOR GELATIN
Donald M. Burness, Rochester, N.Y., assignor to Eastman Kodak Company, Rochester, N.Y., a corporation of New Jersey
No Drawing. Filed Nov. 28, 1961, Ser. No. 155,504
11 Claims. (Cl. 96—111)

This invention relates to gelatin coating compositions containing therein bischloroethylureas.

Various compounds have been suggested as hardeners for gelatin but in substantially every case they have been nonhalogen containing. In many cases, the hardeners which have been used for gelatin have exhibited undesirable photographic effects or have been prone to wander from the layers in which they were placed. Some compounds considered as hardening agents have been objectionable because of their adverse physiological properties.

One object of my invention is to provide gelatin compositions containing compounds having a good hardening effect upon the gelatin after forming coatings for layers therefrom, particularly in preparing photographic products. Another object of my invention is to provide for the hardening of gelatin with compounds relatively free from undesirable photographic effects. A further object of my invention is to provide gelatin hardeners without undesirable physiological properties. A still further object of my invention is to provide gelatin coating compositions containing therein bischloroethylurea type hardeners. Other objects of my invention will appear herein.

I have found that compositions comprising gelatin and a bischloroethylurea compound are useful for obtaining coatings or layers which are resistant to the effects of hot water and to swelling. The compounds which are useful as gelatin hardeners in accordance with my invention are identified with one of the formulas:

(I)
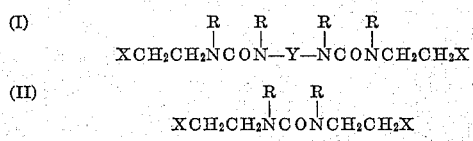

(II)
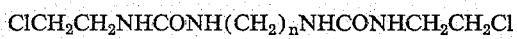

in which
X=halogen
R=H or lower alkyl (1–4 carbons), and
Y is either [(CH$_2$)$_n$O(CH$_2$)$_n$]$_m$, (CH$_2$)$_n$, ($n$ being 1 to 8 and $m$ being 1 to 4) or phenylene Perhaps the most common and best known compound useful as a gelatin hardener is 1,3-bis(2-chloroethyl)urea. Related bischloroethylureas useful in this connection are:

ClCH$_2$CH$_2$NHCONH(CH$_2$)$_n$NHCONHCH$_2$CH$_2$Cl especially where $n=2$ to 6.

These compounds have been found to exhibit strong activity as gelatin hardeners with substantial freedom from undesirable photographic effects and toxicity. Ordinarily the use of these hardeners involves incorporating them in an aqueous solution of gelatin such as a composition to be used in making photographic products or in a gelatin-silver halide photographic emulsion. The hardener is preferably incorporated in the gelatin composition in a proportion of 0.5–10%, based on the weight of the gelatin in the composition.

The hardeners in accordance with my invention may have any of the various halogen substituents. However, as chlorine compounds are the most readily available, the chloroethylureas have been preferred for use.

One of the representative componds of the type described here is 1,3-bis(2-chloroethyl)urea which may be readily prepared from phosgene and ethylenimine as described by Bestian in Ann., 566, 210 (1950) or by the action of thionyl chloride on 1,3-bis(2-hydroxyethyl)-urea. Other compounds useful as hardeners are readily prepared by the reaction of a diamine with 2-oxazolidone, followed by thionyl chloride in accordance with the following reaction:

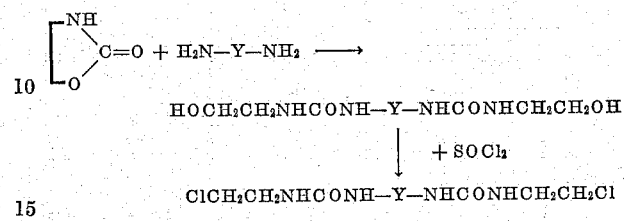

or by reaction of 2-chloroethyl isocyanate with an appropriate diamine.

The following examples illustrate the preparation of various compounds useful as gelatin hardeners in accordance with the following examples:

*Example 1*

*1,3-bis(2 - chloroethyl)urea.*—Added in a dropwise manner to a solution of 70 parts of phosgene and 200 parts of acetone was a solution of 60 parts of ethylenimine and 20 parts of acetone at a temperature of less than −10° C. The temperature was then allowed to rise slowly to a temperature of 20° C. and the mass was added to an equal volume of water. The solid material was filtered off and recrystallized from ethanol. There was obtained 29 parts of colorless needles of 1,3-bis(2-chloroethyl)urea having a melting point of 125–127° C.

*Example 2*

*N,N′-bis(2-chloroethyl carbamyl)-1,6 - hexanediamine.*—A mixture of 116 parts of hexamethylenediamine and 174 parts of oxazolidone in solution in n-butanol was heated on a steam bath for four hours and then cooled. Filtering gave 180 parts of colorless crystals of diol. 100 parts of the diol were mixed with cold thionyl chloride and the mass was stirred for two hours at 20° C. and was then refluxed for 30 minutes. The thionyl chloride was removed, alcohol was added. It was then subjected to distillation at reduced pressure. The residual oil resulting was recrystallized from methanol. There was thus obtained 17 parts of N,N′-bis(2-chloroethyl carbamyl)-1,6-hexanediamine having a melting point of 145–147° C.

*Example 3*

*N,N′-bis(2 - chloroethyl carbamyl)ethylenediamine.*—A procedure similar to that of the preceding example but using ethylenediamine instead of hexamethylenediamine was followed. There resulted N,N′-bis(2-chloroethyl carbamyl)ethylenediamine as a colorless crystalline solid having a melting point of 168–171° C.

The products prepared in the preceding examples were incorporated in gelatin-silver halide photographic emulsions in various concentrations, and the resulting emulsions were coated onto film support. The products obtained were compared with that obtained by coating the emulsion without hardener onto film support. It was found that the speeds and other photographic properties of the emulsion were not detrimentally effected to any appreciable extent by the hardeners in accordance with the invention and the gelatin coatings showed an increased resistance to the effect of water at elevated temperatures. The melting points were determined by immersing the coated film in water and gradually raising the temperature until the coating disintegrated and sloughed off from the film support on which it had been coated. The results obtained are listed in the following table:

| Description | Conc. in percent Based on Wt. of Gel | Fresh Tests | | | Reticulation, °F. | Melting Point, °F. |
|---|---|---|---|---|---|---|
| | | Relative Speed | γ | Fog | | |
| Control | | 100 | 1.15 | .10 | 86 | 88 |
| Control + 1, 3-bis(2-chloroethyl)urea | .6 | 100 | 1.25 | .10 | 95 | 135 |
| Do | 1.2 | 97 | 1.23 | .10 | None | 198 |
| Do | 2.4 | 100 | 1.27 | .09 | None | 212 |
| Control | | 100 | 1.02 | .11 | 84 | 86 |
| Control + N,N'-bis(2-chloroethyl carbamyl)-1,6-hexanediamine as prepared in Example 2 | 1.0 | 95 | 1.05 | .11 | None | 212 |
| Do | 3.0 | 95 | 1.07 | .09 | None | 212 |
| Do | 6.0 | 83 | 1.07 | .08 | None | 212 |
| Control + N,N'-bis(2-chloroethylcarbamyl) ethylenediamine as prepared in Example 3 | 1.2 | 107 | 1.05 | .10 | None | 212 |
| Do | 2.0 | 112 | 1.02 | .09 | None | 212 |

*Example 4*

15.8 parts of 2-chloroethyl isocyanate dissolved in 20 parts of chloroform was added dropwise to a solution of 8.7 parts of N,N'-dimethyl-2-butene-1,4-diamine in 30 parts of chloroform, the temperature being held at 15–25° C. The treatment was continued for 5 hours whereupon 21 parts of colorless solid was obtained by filtering the mass. The product obtained was recrystallized from ethanol. The product was N,N'-bis(2-chloroethyl carbamyl)-N,N'-dimethyl-1,4-diamino-2-butene having a melting point of 188–188.5° C.

*Example 5*

The procedure described in the preceding example was repeated except that piperazine was employed as the diamine. The product obtained was N,N'-bis(2-chloroethylcarbamyl)piperazine having a melting point of 200–201° C. at which temperature it began to show decomposition.

*Example 6*

The procedure of Example 4 was repeated but using 10.8 parts of o-phenylenediamine, 21.1 parts of 2-chloroethyl isocyanate and 400 parts of chloroform. N,N'-bis (2-chloroethyl carbamyl) o-phenylenediamine resulted. The compounds of each of the examples were found to be of value in the hardening effects which they exert upon gelatin when coated out in the form of layers from compositions therewith.

Samples of the compounds prepared in Example 4 and 5 were added to separate portions of a gelatin high speed silver bromoiodide emulsion which had been panchromatically sensitized by the addition of a cyanine dye. The emulsion used contained 245 grams of gelatin per mole of silver halide. The emulsion without the addition of hardener and samples containing hardeners in the proportions shown in the following table were coated onto cellulose acetate support at a coverage of 430 milligrams of silver per square foot. A sample of each coating was exposed on an Eastman 1B sensitometer, processed for five minutes in Kodak DK–50 developer, fixed, washed and dried. The following results were obtained:

| Hardener | Grams of hardener/ 100 grams of gelatin | Rel. Speed | Gamma | Fog | Melting Point, °F. | Swell |
|---|---|---|---|---|---|---|
| Control | | 100 | 1.27 | 0.12 | 88 | 819 |
| Compound of Example 4 | 1.0 | 102 | 1.20 | 0.09 | 194 | 336 |
| Do | 5.0 | 107 | 1.20 | 0.09 | >212 | 25 |
| Control | | 100 | 1.45 | 0.15 | 86 | 557 |
| Compound of Example 5 | 1.0 | 95 | 1.32 | 0.14 | 212 | 255 |
| Do | 5.0 | 91 | 1.37 | 0.14 | >212 | 104 |

The hardening data were taken on a sample which had been preincubated for 3 days at 100° F. and 50% relative humidity. The percent swell was measured as the percent vertical swell after 5 minutes in water at 68° F.

I claim:

1. A composition comprising gelatin and a compound selected from the group consisting of those compounds having the formula:

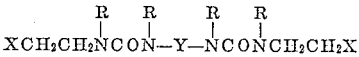

and those having the formula:

in which
   X is halogen
   R is selected from the group consisting of H and alkyls of 1 to 4 carbon atoms and Y is selected from the group consisting of $[(CH_2)_nO(CH_2)_n]_m$ $(CH_2)_n$ $n$ being 1 to 8 and $m$ being 1 to 4 and phenylene.

2. A composition comprising gelatin and a compound having the formula:

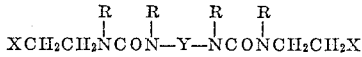

in which
   X is halogen
   R is selected from the group consisting of H and alkyls of 1 to 4 carbon atoms and Y is selected from the group consisting of $[(CH_2)_nO(CH_2)_n]_m$ $(CH_2)_n$, $n$ being 1 to 8 and $m$ being 1 to 4 and phenylene.

3. A composition comprising gelatin and a compound having the formula:

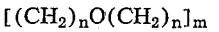

in which
   X is halogen
   and R is selected from the group consisting of H and alkyls of 1 to 4 carbon atoms.

4. A gelatin-silver halide photographic emulsion containing therein a compound selected from the group consisting of those compounds having the formula:

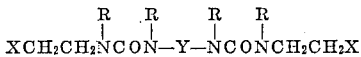

and those having the formula:

in which
   X is halogen
   R is selected from the group consisting of H and alkyls of 1 to 4 carbon atoms and Y is selected from the group consisting of $[(CH_2)_nO(CH_2)_n]_m$ $(CH_2)_n$, $n$ being 1 to 8 and $m$ being 1 to 4 and phenylene.

5. A composition comprising gelatin and 1,3-bis(2-chloroethyl)urea.

6. A composition comprising gelatin and N,N'-bis(2-chloroethyl carbamyl)-1,6-hexanediamine.

7. A composition comprising gelatin and N,N'-bis-(2-chloroethyl carbamyl)ethylenediamine.

8. A gelatino-silver halide photographic emulsion containing therein 1,3-bis(2-chloroethyl)urea.

9. A composition comprising gelatin and N,N'-bis(2-chloroethyl) o-phenylene diamine.

10. A composition comprising gelatin and N,N'-bis(2-chloroethyl carbamyl)piperazine.

11. A composition comprising gelatin and a compound selected from the group consisting of those compounds having the formula:

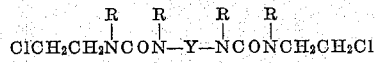

and those having the formula:

in which
    R is selected from the group consisting of H and alkyls of 1 to 4 carbon atoms
    and Y is selected from the group consisting of $$[(CH_2)_nO(CH_2)_n]_m$$

$(CH_2)_n$, $n$ being 1 to 8 and $m$ being 1 to 4 and phenylene.

References Cited in the file of this patent
UNITED STATES PATENTS

| | | |
|---|---|---|
| 2,710,839 | Swakon et al. | June 14, 1955 |
| 2,938,892 | Sheehan | May 31, 1960 |
| 2,944,898 | Beavers et al. | June 12, 1960 |